S. W. PUTNAM, 3D.
TIRE LATHE.
APPLICATION FILED OCT. 7, 1918.
1,328,763.
Patented Jan. 20, 1920.
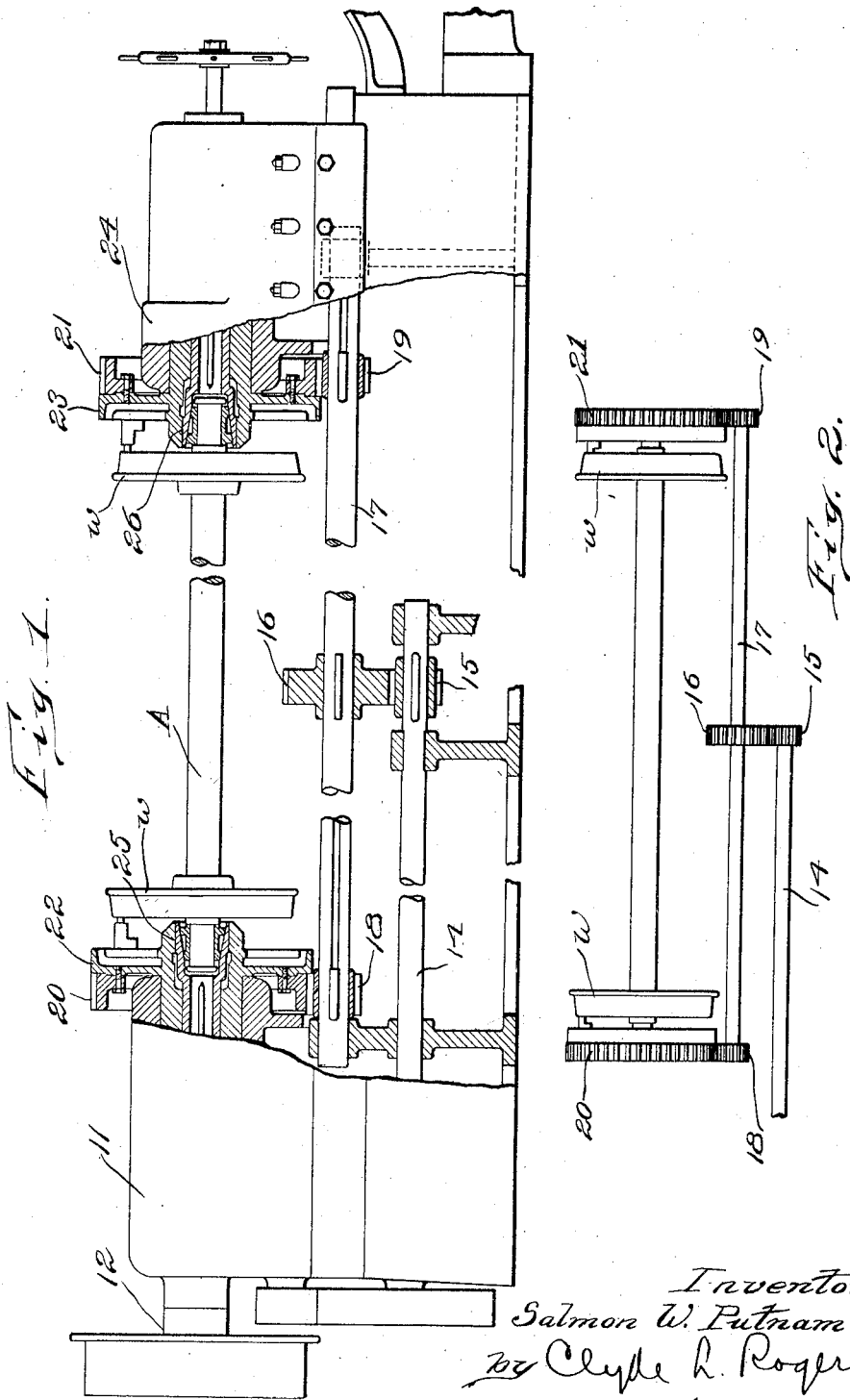

UNITED STATES PATENT OFFICE.

SALMON W. PUTNAM, 3D, OF ROCHESTER, NEW YORK, ASSIGNOR TO ARTHUR H. INGLE, OF ROCHESTER, NEW YORK.

TIRE-LATHE.

1,328,763.  Specification of Letters Patent.  Patented Jan. 20, 1920.

Application filed October 7, 1918. Serial No. 257,154.

*To all whom it may concern:*

Be it known that I, SALMON W. PUTNAM, 3d, a citizen of the United States, and resident of Rochester, county of Monroe, State of New York, have invented an Improvement in Tire-Lathes, of which the following description, in connection with the accompanying drawings, is a specification, like characters on the drawings representing like parts in each of the several views.

This invention relates to lathes and particularly to "double tire turning" lathes of a type adapted to turn and finish tires of locomotives and railway cars and the like that are fixed on the axle adjacent the ends thereof. Lathes of this character have been produced in two types, the one an open center type in which the wheels are internally disposed with respect to the face plates or driving members, and the other the closed center type in which the wheels are externally disclosed with respect to the face plates or driving members. The closed center type has presented serious difficulties in practice for the reason that it necessitated the use of a gap in the center driving element exposing thereby the bearings to chips and foreign matter, and also the use of a detachable segment in the driving gear; also the mounting of the driving mechanism between the wheels to be machined on the lathe, practically closes up the central portion of the lathe, greatly restricting the space for accumulation of chips, while by contrast the open center type of tire lathe is more open and accessible and for these reasons also preferred. In the open center type as previously produced however another objection has arisen in the difficulty which has been experienced in driving the face plates or driving members at the two ends of the machine in exact synchronism. This has been for the reason that the driving shaft extending lengthwise of the lathe and deriving its power from the headstock end thereof with pinions fixed thereon and driving the respective face plates, has been subject to torsion in the considerable length thereof between such pinions so that the face plate at the tail stock end of the machine would lag behind the headstock face plate. This trouble has been largely increased in later developments of the art where improved tool steels have permitted the taking of much heavier cuts and it has even sometimes happened that the main driving shaft has received a permanent set or twist due to abnormal torsion thereof between the face plates. It has been proposed to remedy this difficulty by employing internal gears on the face plate with a drive compounded by means of another set of gears on stub shafts back to the main driving shaft, but while this has reduced the torsion on the main driving shaft, it has been of very doubtful advantage, and even sometimes involved a loss in rigidity and unison in driving of the two face plates, since the back lash in the additional trains of gears has more than offset the gain due to less torsion in the driving shaft. The use of internal gears on the face plate has also required the use of driving pinions therefor which could not be supported at their outer ends, and in view of the fact that the working load on the teeth of these pinions often approaches forty tons, this unsupported outer pinion end has been a serious inherent weakness. The principal object of the present invention is to provide an open center type of lathe with means whereby the torsion in the driving shaft of the face plates is equalized between them, and the power transmitted through relatively short shafts and in a manner so that the face plates are driven in substantially precise synchronism. To this end I provide a countershaft suitably mounted as illustratively shown, in the lathe bed and extending between the face plates, with pinions thereon to drive the respective face plates and with an intermediate gear fixed thereon midway between said pinions and receiving power from a driving shaft extending to the headstock end of the machine. The foregoing and other objects and advantages of the invention will more fully appear from the following detailed description, and the distinctive features of novelty will thereafter be pointed out in the appended claims.

Referring to the drawings:

Figure 1 shows a lathe embodying the invention in side elevation with portions broken away in vertical section and also the intermediate structure of the lathe broken away; and Fig. 2 is a diagrammatic side elevation illustrating the arrangement of driving gearing.

10 indicates the lathe bed having mounted in the headstock end 11 thereof driving means 12 which through change gearing 13 drives the shaft 14 which is journaled in the bed of the machine and extends lengthwise thereof to a point substantially midway of the length of the lathe where it has fixed thereon a pinion 15 in driving engagement with a gear 16 which is fixed on a shaft 17 that is journaled in the lathe bed lengthwise thereof and extends between the face plates. This shaft has slidably keyed thereon adjacent the ends thereof pinions 18, 19 which are in driving engagement with gears 20, 21 on the headstock face plate 22 and the tail stock face plate 23 respectively, though it is to be here noted that only one of these pinions actually requires to be slidable on the shaft to permit relative adjustment of the headstock and tailstock to space them the required distance apart. The tail stock housing 24 may be of usual type and mounted for adjustment on the lathe bed to receive the ends of the axle A in the headstock and tail stock chucks 25, 26 as is usual. The wheels W, the tires of which are to be turned may be engaged by any suitable driving dogs carried by the face plates as usual.

With the described construction and arrangement of driving gearing, the element of torsion as a detrimental factor is substantially eliminated for the reason that any torsion factor that might exist in the shaft 17 is equalized and thus neutralized in the two portions thereof at each side of the driving gear 16. Further these shaft portions from the gear 16 to the respective pinions 18, 19 are relatively short and hence the torsion element in toto is very greatly reduced. Still further, the shaft 14 leading from the headstock end of the machine may be of relatively small size, i. e., of much less diameter than has heretofore been the case, since by reason of the drive through the reducing gearing 15, 16 said shaft may be run at relatively high speed, and any ordinary torsion factor that might exist therein would have no detrimental or objectionable effect. I am aware that the invention may be embodied in other specific forms without departing from the spirit or essential attributes thereof, particularly as to the manner of mounting the usual shafts and gears, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A tire lathe, comprising independent head and tail stock face plates spaced apart to receive between them a car axle with wheels thereon to be machined, a gear on each face plate, a countershaft journaled in the lathe bed and carrying pinions in mesh with said gears, a gear fast on said countershaft substantially midway between said pinions, a driving shaft parallel to said countershaft, and a pinion on said driving shaft in mesh with the gear on the countershaft.

2. A tire lathe, comprising opposed rotatable face plates spaced apart a substantial distance for the purpose stated, a gear rigidly connected to each face plate, a countershaft extending lengthwise of the lathe below said face plates, pinions keyed on said countershaft and adapted to mesh with said gears, a gear fast on said countershaft centrally between said pinions, a driving shaft mounted parallel to said countershaft, and a pinion on said driving shaft in mesh with the gear on the countershaft.

3. A tire lathe comprising opposed rotatable members equipped to engage the wheels at the ends of a car axle and spaced a substantial distance apart, a gear directly and rigidly connected to each rotatable member, a countershaft extending lengthwise of the lathe, pinions fixed to said countershaft and engaging said gears, a gear fixed on said countershaft substantially midway between said pinions and means for driving the last named gear.

4. A tire lathe comprising opposed rotatable members, equipped to engage and drive wheels fixed at the respective ends of a car axle, a gear directly and rigidly connected to each member, a countershaft extending lengthwise of the lathe and equipped with pinions engaging said gears, and driving connections to said countershaft, arranged substantially midway between said pinions whereby torsion effects at the two ends of said countershaft are neutralized.

5. A lathe of the kind described, comprising spaced apart face plates mounted in opposed relation to receive between them a car axle or the like with wheels at the ends thereof to be machined, and means for simultaneously driving said face plates consisting in driving gearing located substantially midway between said face plates with a single shaft connection from said gearing leading to both of the respective face plates and in direct geared engagement therewith.

In testimony whereof, I have signed my name to this specification.

SALMON W. PUTNAM, 3D.